(12) United States Patent
Robins et al.

(10) Patent No.: US 6,918,044 B1
(45) Date of Patent: Jul. 12, 2005

(54) PASSWORD PROTECTION FOR HIGH RELIABILITY COMPUTER SYSTEMS

(75) Inventors: Kristen Marie Robins, San Jose, CA (US); Ronnie B. Kon, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/419,350

(22) Filed: Oct. 15, 1999

(51) Int. Cl.[7] .............................. H04L 9/00; H04K 1/00; G06F 11/00; G06F 11/30
(52) U.S. Cl. ...................... 713/202; 713/155; 713/183; 713/324; 714/2; 714/10; 714/31; 714/48; 709/208; 709/226
(58) Field of Search ................................. 713/155, 166, 713/183, 200–202, 324, 151, 169; 714/2, 10, 11, 31, 48; 709/208, 226

(56) References Cited

U.S. PATENT DOCUMENTS

| | | | |
|---|---|---|---|
| 5,003,595 A | | 3/1991 | Collins et al. ................. 380/25 |
| 5,163,147 A | | 11/1992 | Orita ........................... 395/600 |
| 5,241,594 A | * | 8/1993 | Kung .......................... 713/151 |
| 5,241,599 A | | 8/1993 | Bellovin et al. .............. 380/21 |
| 5,305,448 A | | 4/1994 | Insalaco et al. ............. 395/425 |
| 5,351,136 A | | 9/1994 | Wu et al. .................... 358/440 |
| 5,421,006 A | | 5/1995 | Jablon et al. ............... 395/575 |
| 5,421,012 A | | 5/1995 | Khoyi et al. ................. 395/650 |
| 5,440,635 A | | 8/1995 | Bellovin et al. ............. 380/25 |
| 5,452,448 A | | 9/1995 | Sakuraba et al. ........... 395/600 |
| 5,584,023 A | | 12/1996 | Hsu ........................... 395/620 |
| 5,655,077 A | * | 8/1997 | Jones et al. ................. 713/201 |
| 5,671,354 A | | 9/1997 | Ito et al. ................. 395/187.01 |
| 5,680,461 A | | 10/1997 | McManis ..................... 380/25 |
| 5,684,950 A | | 11/1997 | Dare et al. ............. 395/187.01 |
| 5,708,780 A | | 1/1998 | Levergood et al. .... 395/200.12 |
| 5,742,830 A | | 4/1998 | Elko et al. ................... 395/728 |
| 5,778,365 A | | 7/1998 | Nishiyama ..................... 707/9 |

(Continued)

FOREIGN PATENT DOCUMENTS

WO 99/53408 10/1999 ........... G06F/15/16

OTHER PUBLICATIONS

"Access Control Product Information", Ascend Communications, Inc., 4 pages.
Bellovin, Steven M., "Problem Areas for the Ip Security Protocols", Jul. 22–25, 1996, Proceedings of the Sixth Usenix UNIX Security Symposium, San Jose, CA.

(Continued)

*Primary Examiner*—Gilberto Barrón
*Assistant Examiner*—A. Nobahar
(74) *Attorney, Agent, or Firm*—Thelen Reid & Priest, LLP; David B. Ritchie; Masako Ando

(57) ABSTRACT

A high reliability computer system includes a first processing engine (PE), a first memory and a third memory both accessible by the first PE, a second PE, and a second memory and a fourth memory both accessible by the second PE. The first memory contains initialization information for the first PE. The third memory has a location for storing an enable password or a surrogate therefor for the first PE. The second memory contains initialization information for the second PE. The computer system also includes circuitry for switching control of the system from the first PE to the second PE upon detection of a failure of the first PE, and a password passer writing the enable password or a surrogate therefor of the first PE to the fourth memory. Alternatively, a network system includes an authentication, authorization and accounting (AAA) or any other password server having a database for maintaining an enable password for a high reliability computer system. The high reliability computer system includes an interface capable of communicating with the password server over an information bus. The interface obtains the enable password from the password server in response to a request from either one of the first and second PEs.

85 Claims, 6 Drawing Sheets

U.S. PATENT DOCUMENTS

| | | | | |
|---|---|---|---|---|
| 5,793,763 | A | | 8/1998 | Mayes et al. ................ 370/389 |
| 5,835,727 | A | | 11/1998 | Wong et al. ........... 395/200.68 |
| 5,845,070 | A | | 12/1998 | Ikudome ................ 395/187.01 |
| 5,898,780 | A | | 4/1999 | Liu et al. ...................... 380/25 |
| 5,925,099 | A | | 7/1999 | Futral et al. ................ 709/204 |
| 5,941,964 | A | | 8/1999 | Young et al. ............... 710/100 |
| 5,944,824 | A | | 8/1999 | He ............................. 713/201 |
| 5,961,586 | A | | 10/1999 | Pedersen .................... 709/201 |
| 5,987,232 | A | | 11/1999 | Tabuki .................. 395/187.01 |
| 5,991,810 | A | | 11/1999 | Shapiro et al. ............. 709/229 |
| 6,006,334 | A | | 12/1999 | Nguyen et al. ............. 713/202 |
| 6,011,910 | A | | 1/2000 | Chau et al. ............ 395/200.59 |
| 6,018,770 | A | | 1/2000 | Little et al. ................. 709/223 |
| 6,021,496 | A | | 2/2000 | Dutcher et al. ............. 713/202 |
| 6,044,155 | A | | 3/2000 | Thomlinson et al. ......... 380/49 |
| 6,047,376 | A | | 4/2000 | Hosoe ........................ 713/201 |
| 6,088,451 | A | * | 7/2000 | He et al. .................... 713/201 |
| 6,092,196 | A | | 7/2000 | Reiche ....................... 713/200 |
| 6,141,687 | A | | 10/2000 | Blair .......................... 709/225 |
| 6,324,571 | B1 | * | 11/2001 | Hacherl ...................... 709/208 |
| 6,434,700 | B1 | * | 8/2002 | Alonso et al. .............. 713/169 |
| 6,496,940 | B1 | * | 12/2002 | Horst et al. ..................... 714/4 |

OTHER PUBLICATIONS

Cisco User Control Point, pp. 1–4, printed from http://www.cisco.com/warp.public/728/ucp/ucp ds.htm om Sep. 10, 1998.

IPSec Network Security, pp. 1–69, printed from http://www.cisco.com/univercd/cc/td/doc/products/software.ios113ed/113t/113t 3/ipsec.

Krawczyk, Hugo, "SKEME: A Versatile Secure Key Exchange Mechanism for Internet", 1996, IEEE, Proceedings of the 1996 Symposium on Network and Distributed Systems Security.

Patel, B., et al. "Securing L2TP using IPSEC", May 1998. PPPEXT Working Group, pp. 1–10, printed from http://www/masinter.net/~12tp/ftp/draft–ietf–pppext–12tp–security–02.txt.

"Remote Access Network Security", Ascend Communications, Inc., printed from http://www.ascend.com/1103.html, on Jul. 24, 1998, pp. 1–8.

Rigney, et al., "Remote Authentication Dial In User Service (RADIUS)", Network Working Group, RFC 2138, Apr. 1997, pp. 1–57.

Carrel, D. et al. The TACACS+ Protocol, Version 1.78, Cisco Systems, Inc., printed from ftp://ftp–eng.cisco.com/gdweber/tac–rfc.1.78.txt on Oct. 23, 2000.

* cited by examiner

PASSWORD PROTECTION FOR HIGH RELIABILITY COMPUTER SYSTEMS

STATEMENT OF RELATED APPLICATION

This application is related to U.S. patent application Ser. No. 09/419,348, entitled "METHOD AND APPARATUS FOR CONFIGURATION IN MULTI PROCESSING ENGINE COMPUTER SYSTEMS", filed on even date herewith in the names of the same inventors and commonly assigned herewith.

BACKGROUND OF THE INVENTION

1. Field of the Invention

The present invention relates to the field of computer systems and data communications networks. More particularly, the present invention relates to a method and apparatus for providing password protection for multiple processing engines (PEs) in a high reliability computer system such as found in a data communications network.

2. The Background

A computer system on a data communications network is potentially accessible by anyone on the network. Since the Internet interconnects various networks, a computer system on such a network is potentially accessible to the tens of millions of people who now access the Internet. Therefore, security is a major requirement for almost all computer systems, so as to protect such computer systems from inadvertent or intentional accesses and undesirable actions.

Password protection is one of the various security devices for restricting or limiting access to a computer system. Passwords may be set in accordance with the mode or nature of commands to be executed on the system; various levels of access may be provided. For example, initial access to the computer system may be secured by setting passwords for individual access lines to the system through its interfaces and ports. Execution of some classes of commands may be allowed only to some privileged users, but not to all users who log in to the system. An ordinary user may execute nondestructive commands such as connecting to remote devices, changing terminal settings on a temporary basis, listing system information, etc. However, potentially destructive commands such as changing configuration parameters that affect the system as a whole, shutting down an interface, rebooting the system, and the like, generally require additional protection. The former commands are referred to as "user mode" commands and are executed in an ordinary user mode, and the latter are referred to as "privileged mode" commands, executable only in one of possibly several privileged modes. Typically, a privileged user is required to enter an enable password to get into the privileged mode after he or she is granted accesses to the user mode. Passwords are typically set during the initial configuration process of the system.

FIG. 1 shows an example of an initialization process which begins with the startup of a computer system, for example, a packet router. In a typical startup initialization process, the system checks the hardware and performs a power-on self-test by executing commands stored in a ROM (read only memory), and then finds and loads operating system (OS) software. The OS software may be loaded, for example, from a flash memory or ROM. Next, the system finds and loads configuration information from a configuration file. If the previously created and saved configuration file is found in a non-volatile random access memory (NVRAM), the configuration file is loaded into a memory (RAM) and executed on a line-by-line basis. This execution of the configuration file defines settings and parameters of interfaces and other hardware in the system, resulting in the system becoming operational.

If no previously created configuration file exists, the OS, such as a Cisco IOS™ product, available from Cisco Systems, Inc. of San Jose, Calif., executes a predefined question-driven configuration display (setup dialog) to a user and creates a basic configuration. The newly created configuration file is stored in the NVRAM and will be loaded as a default at the next initialization process. In the case of routers, for example, the configuration process includes defining router-specific attributes and protocol functions, defining addresses, operating rates and other parameters of interfaces and other hardware, and establishing passwords (including an enable password). The passwords can be changed thereafter by a user who has access to a privileged mode (a user with the enable password).

Reliability is another important requirement for computer systems, especially for computer systems maintaining important information or for those systems the failure of which would significantly affect other systems. Routers are an example of such computer systems requiring high reliability. Routers usually transfer packets of data from one network to another. The failure of a router may affect all networks and hosts that send or receive packets handled by that router. One technique used to realize high reliability in a computer system is to make the system redundant, providing the system with a primary processing engine and a secondary (back-up) processing engine. In such a redundant processing engine system, when the primary processing engine fails, the secondary processing engine can immediately take over the duties of the primary processing engine so as to continue running the system.

A processing engine (PE) usually includes one or more CPUs or microprocessors, supporting circuitry, a variety of memories such as DRAM, ROM, static RAM, etc., and a bus. In a symmetric multiprocessing (SMP) system, for example, a PE is a collection of unit processors. A PE may also be implemented as a microcode engine.

FIG. 2 shows operations in a prior art redundant PE system. In such a redundant PE system, when the system is started, the primary PE performs the initialization process for the system. The primary PE configures the system by loading and executing the configuration file thereof, during which an enable password for the primary PE (along with other passwords for the system) is set so as to protect the system. The secondary PE waits for the primary PE to fail, and then takes over the system after the failure of the primary PE is detected. Such a failover may take place when a failure of the hardware or a severe problem in the software occurs. For example, when a bus error or a segmentation violation occurs, it may be better to switch to a back up PE via a seamless take-over from the original PE rather than to attempt to resolve the problem on the original PE.

The failure may be detected by the lack of or issuance of a specific indication signal from the primary PE. Once the secondary PE takes over the system, it reboots the failed PE and performs reinitialization. At this point the secondary PE loads and executes its own configuration file (the configuration may or may not be the same as that of the primary PE). An enable password and other passwords are set for the secondary PE in this configuration process, and the system is password-protected as well.

In many computer systems, such as network routers, the operating system uses a command line interface (CLI). In a CLI-based system, commands are executed regardless of whether the commands are entered by a user, for example, from a console, or read from an executable file such as a configuration file. Thus, in a CLI-based system, loading a configuration file into a memory causes all configuration commands in the file to be executed. Therefore, if the secondary PE in a redundant PE system reads its configuration file, it could potentially redefine or alter all of the settings and parameters of the interfaces and other hardware of the system, which are still under the control of the primary PE. For this reason, in a conventional redundant PE system using a CLI, the secondary PE is not allowed to load the configuration file into its memory until the primary PE fails.

There are some situations where it is desirable for a redundant PE system to make certain commands available to the secondary PE before the primary PE fails. For example, suppose that in a router the primary PE is handling all routing functions, and the secondary PE is monitoring the primary PE waiting for it to fail. The primary PE could be signaling on a communications link, such as a backplane line, once per second as a result of a high-priority interrupt to let the secondary PE know that all is fine, but actually it is in an endless loop in a slightly lower priority interrupt. In this situation the primary PE has failed, but it is indicating to the secondary PE that it has not failed, preventing the secondary PE from taking over. In such a case, a system administrator may want to reboot the primary PE to fix the situation, forcing the primary PE to fail and allowing the secondary PE to take over. Such a forced failover may be caused by having the system administrator issue a command (presumably a privileged mode command) through a console port for the secondary PE.

However, because the secondary PE is prohibited from loading its configuration file until the first PE fails, it has no password protection until that time comes. If the system allows a user to obtain access to such privileged mode (without an enable password) through the second console, anyone with access to the second console can issue any destructive or privileged commands, for example, changing the configuration and then causing a forced failover at will. Such unrestricted issuance of commands without password protection poses a risk to the computer system. For example, some loss of information is almost inevitable if a failover occurs. Repeated forced failovers may lead to serious consequences. In addition, the performance of the secondary PE may be lower than that of the primary PE, so that a forced failover could cause lower performance in the system than desired. Thus, the prior art redundant PE system can improve its reliability only at the cost of its security.

SUMMARY OF THE INVENTION

A high reliability computer system includes a first processing engine (PE), a first memory and a third memory both accessible by the first PE, a second PE, and a second memory and a fourth memory both accessible by the second PE. The first memory contains initialization information for the first PE. The third memory has a location for storing an enable password or a surrogate therefor for the first PE. The second memory contains initialization information for the second PE. The computer system also includes circuitry for switching control of the system from the first PE to the second PE upon detection of a failure of the first PE, and a password passer writing the enable password or a surrogate therefor of the first PE to the fourth memory. Alternatively, a network system includes an authentication, authorization and accounting (AAA) or any other password server having a database for maintaining an enable password for a high reliability computer system. The high reliability computer system includes an interface capable of communicating with the password server over an information bus. The interface obtains the enable password from the password server in response to a request from either one of the first and second PEs.

DETAILED DESCRIPTION OF PREFERRED EMBODIMENTS

Those of ordinary skill in the art will realize that the following description of the present invention is illustrative only and not in any way limiting. Other embodiments of the invention will readily suggest themselves to such skilled persons having the benefit of this disclosure.

Figure 1:
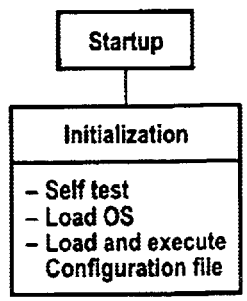
FIG. 1 is a process flow diagram illustrating an example of initialization process which begins with the startup of a computer system.
Figure 2:
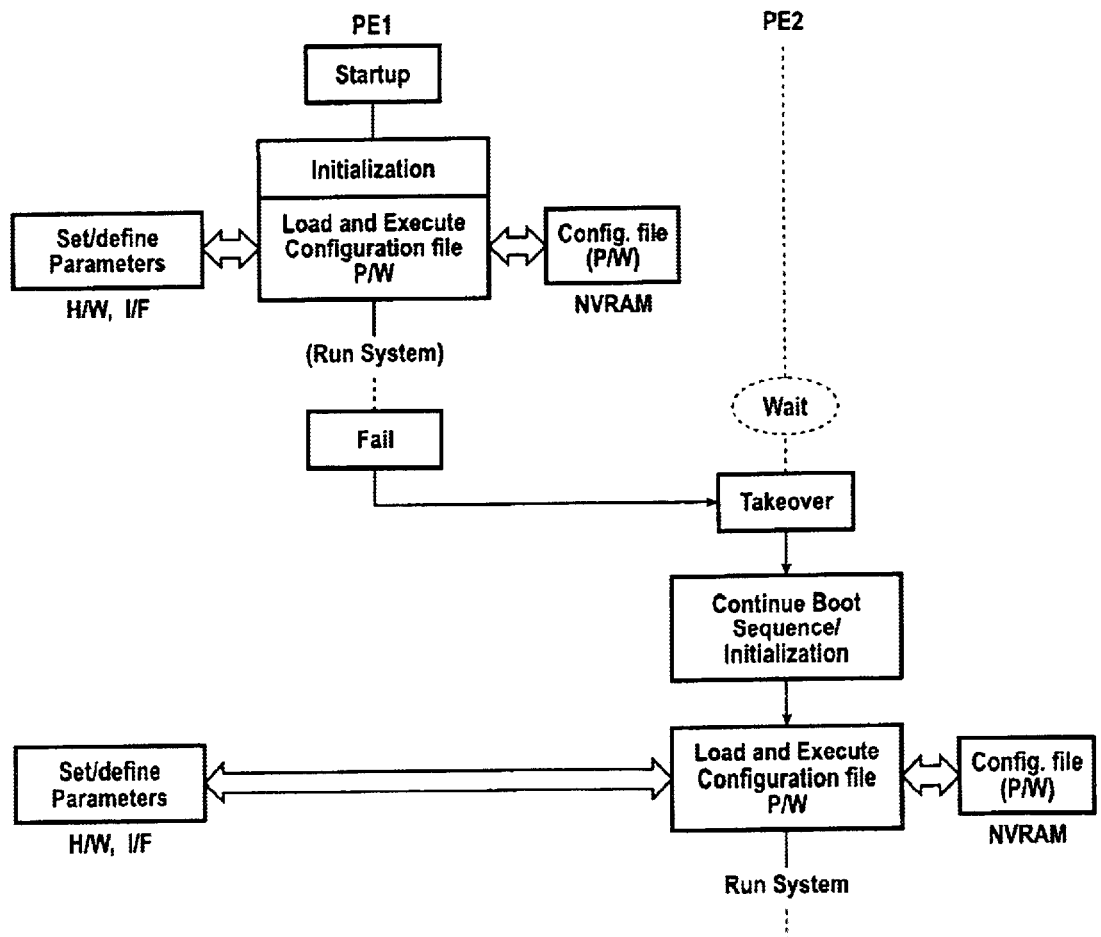
FIG. 2 is a process flow diagram illustrating operations in a prior art redundant PE system.
Figure 3:
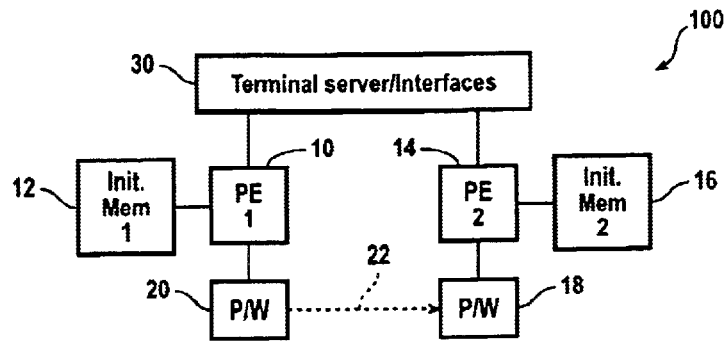
FIG. 3 is a system block diagram schematically illustrating a high reliability computer system according to a presently preferred embodiment of the present invention.

FIG. 3 schematically shows a high reliability computer system 100 according to an embodiment of the present invention. The computer system 100 includes a first PE 10 (operating as the primary PE), a first memory 12 accessible by the first PE 10, a second PE 14 (operating as a secondary PE), a second memory 16 accessible by the second PE 14, a third memory 20 accessible by the first PE 12, and a fourth memory 18 accessible by the second PE 14. The first memory 12 contains initialization information for the first PE 10 and the second memory 16 contains initialization information for the second PE 14. The initialization information typically includes a configuration file to configure the system software and hardware such as terminal server and/or interfaces 30. The first and second memories 12 and 16 are typically non-volatile memories, such as NVRAM, PCMCIA flash memory cards, hard disks, and the like. The third memory 20 has a predetermined location for storing an enable password (P/W) for the first PE 10. The third memory 20 may be a RAM of the first PE 10. The fourth memory 18 has a predetermined location for storing an enable password (P/W) for the second PE 14. The fourth memory 18 may be a RAM of the second PE 14. The first PE 10 and the first memory 12 may be provided on one CPU card (first CPU card), and the second PE 14 and the second memory 16 may be provided on another CPU card (second CPU card). The third and fourth memories 20 and 18 may also be included in the first and second CPU cards, respectively.

The first PE 10 is the primary PE controlling the system 100. When a failure of the first PE 10 is detected, however, switching circuitry (not shown) switches control of the system 100 to the second PE 14. The second PE 14 has been waiting for the first PE 10 to fail, and when the first PE 10 fails, the control of the system 100 is switched to the second PE 14. Such a failover may take place when a failure of the hardware or a severe problem in the software occurs. For example, when a bus error or a segmentation violation occurs, it may be better to switch to the second PE 14 from the first PE 10 rather than to attempt to resolve the problem on the first PE 10. This seamless switching allows the computer system 100 to continue running, realizing high reliability of the system.

The failure of the first PE 10 may be detected, for example, by the lack of a predetermined signal, or the issuance of a predefined signal, from the first PE 10. The switching circuitry may be implemented in a controller or a chipset in any convenient location in the system 100, as is well understood by those of ordinary skill in the art.

At the startup of the computer system 100, the first PE 10 performs the initialization process by reading the initialization information from the configuration file stored in the first memory 12, during which an enable password (P/W) is set for the first PE 10 and written to the third memory 20. A password passer (as indicated by 22 in FIG. 3) writes the enable password of the first PE 10 to the fourth memory 18, so that the enable password is available to the second PE 14. The password passer may be implemented in the first PE 10, the second PE 14, or any convenient location in the system 100.

The password passer controls transmission of the enable password data to the fourth memory 18. The password passer may "push" the enable password of the first PE 10 into the fourth memory 18. That is, the password passer passes the enable password to the fourth memory 18 without a request from the second PE 14, for example, whenever the enable password is changed. In this case, the password passer may be implemented in the first PE 10. It should be noted that the fourth memory 18 is dedicated to the second PE 14, as well as the third memory 20 is dedicated to the first PE 10. Thus, typically, the first PE 10 does not have direct access to the fourth memory 18 and it needs cooperation (or response) of the second PE 14 to write the enable password to the fourth memory 18. For example, the password passer (the first PE 10) may issue a write-password command to the second PE 14.

As described above, the password passer may write the enable password of the first PE 10 to the fourth memory 18 at the initialization of the system 100. For example, the password passer may write the enable password to the fourth memory 18 at the same time when the enable password is set for the first PE 10. The initialization information for the first PE 10 may include such instructions to cause the password passer to write the enable password to the fourth memory 18. In addition, the password passer may write the enable password to the fourth memory 18 whenever the running configuration of the first PE 10 is saved on the first memory 12. A running configuration (or active configuration) is a configuration file resides in main memory and contains the configuration commands that are currently active on the system. Changes to the running configuration, including those of passwords, are saved on a non-volatile memory (i.e., the first memory 12) when an explicit instruction is given. Preferably, the password passer writes the enable password of the first PE 10 to the fourth memory 18 every time the enable password of the first PE 10 is changed, so that the current and updated enable password is always available to the second PE 14.

Alternatively, the password passer may "pull" the enable password of the first PE 10; the password passer passes the enable password to the fourth memory 18 only when the second PE 14 requests to do so. That is, the password passer may write the enable password of the first PE 10 to the fourth memory 18 in response to a command from the second PE 14. For example, the second PE 14 may periodically issue a command to the password passer to retrieve the enable password from the third memory 20 and write it to the fourth memory 18. An attempt by a user such as a system administrator to issue a privileged command through the second PE 14 may invoke the operation of the password passer to write the enable password to the fourth memory 18. Then the second PE 14 performs a password-check on the enable password entered by the user comparing with the stored enable password.

Next, the operation of the high reliable computer system 100 is described using an example of a network router. In a network router, the first PE 10 (PE1) and the first memory 12 (NVRAM1) may be provided on one CPU card (first CPU card), and the second PE 14 (PE2) and the second memory 16 (NVRAM2) may be provided on another CPU card (second CPU card). The fourth memory 18 (RAM2) may also be included in the second CPU card. Each CPU card usually includes a ROM containing bootstrap software. The ROM may also contain operating system (OS) software. For example, the OS software for a router maybe a Cisco IOS™ product, available from Cisco Systems, Inc. of San Jose, Calif. The interfaces 30 may include one or more of fixed interfaces, modular interfaces (changeable only when the system is turned off), interface processor cards (changeable while the system is running), and the like. The router also includes a main memory (RAM), a flash memory containing the OS software, and console ports for communicating with the CPU cards (these components are not shown in FIG. 3). The main memory may be provided on each CPU card, or may be commonly used by the two CPU cards. A router may also include additional flash memory and auxiliary ports. Note that those of ordinary skill in the art will recognize that this one CPU per PE card architecture is used herein only as an example and is not a requirement. Therefore, this example is only illustrative and not for the purpose of limiting the present invention.

Figure 4:
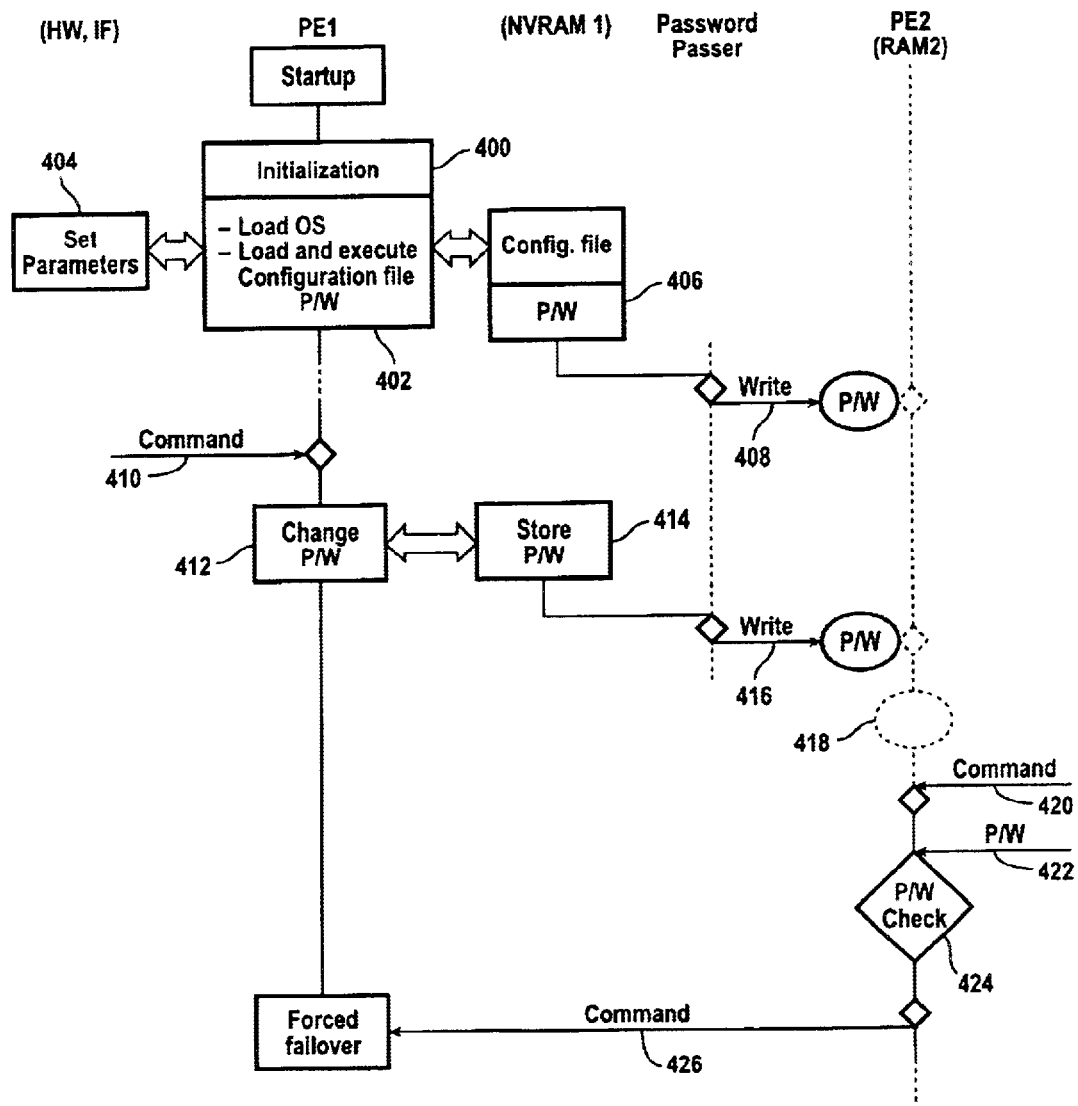
FIG. 4 is a process flow diagram illustrating an example of operation of a high reliability computer system according to one presently preferred embodiment of the present invention.

FIG. 4 schematically shows an example of the operations of the high reliability computer system 100 according to one embodiment of the present invention.

When the system 100 is started, the first PE 10 (PE1) performs an initialization of the system (block 400). During the initialization, the first PE 10 loads OS software and loads and executes the configuration file. Typically, the configuration file is read from the first memory 12 (NVRAM1) containing the initialization information (block 402). During this configuration process, the first PE 10 sets parameters for the interfaces and other hardware of the system (block 404), and sets the enable password along with other passwords according to the configuration information. If the first PE 10 does not find an already-saved configuration file in the first memory 12, it creates a new configuration and establishes an enable password and other passwords (by communicating with a system administrator). The new configuration and the enable (and other) password are saved on the first memory 12. At this point, the enable password is stored in a predefined location on the first memory 12 (block 406). The enable password may be encrypted (either before or after it is passed) so as to help prevent accidental exposure in the configuration file when displayed on a screen. At the same time, the password passer writes the enable password of the first PE 10 to the fourth memory 18 (RAM2) of the second PE 14 (PE2) (step 408).

The enable password may be changed after the initial setting thereof (block 412). This may be done by a user having the access to a privileged command (step 410). When the enable password is changed, the new enable password is copied to the first memory 12 (block 414) when an explicit instruction is given. The password passer writes the new enable password to the fourth memory 18 of the second PE 14 (step 416). Typically, when any changes are made to the running configuration, the new configuration is copied to the first memory 12 upon an explicit instruction.

Suppose that in some situations a user such as a system administrator needs to access the computer system 100 to issue a command using the second PE 14 (block 418). The user makes an attempted access to the system 100 through a console port for the second PE 14 (step 420). The user is required to enter the enable password in order to obtain access to the privileged command (step 422). The second PE 14 may prompt the user to enter an enable password. The second PE 14 checks the entered enable password using the enable password stored in the fourth memory 18 (block 424). If the user is authorized, the user will be allowed access to issue the privileged command, for example, changing the configuration or forcing a failover of the first PE 10 (step 426).

The above example illustrates the case where the password passer "pushes" the enable password to the fourth memory 18 of the second PE 14. However, those of ordinary skill in the art will understand other cases where the password passer "pulls" the enable password as well without more detailed explanation.

Figure 5:
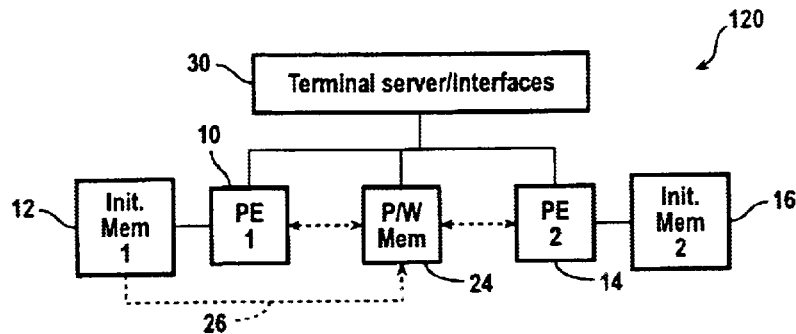
FIG. 5 a system block diagram schematically illustrating a high reliability computer system according to another presently preferred embodiment of the present invention.

FIG. 5 schematically shows a high reliability computer system 120 according to another embodiment of the present invention. For convenience, the like components bear like numeral references as in the previous embodiment. The computer system 120 includes a first PE 10 (operating as the primary PE), a first memory 12, a second PE 14 (operating as the secondary PE), a second memory 16, and a password memory 24. The first memory 12 is accessible by the first PE 10 and contains initialization information for the first PE 10. The second memory 16 is accessible by the second PE 14 and contains initialization information for the second PE 14. The initialization information typically includes a configuration file to configure the system software and hardware 30. The first and second memories 12 and 16 are typically non-volatile memories, such as NVRAM. The password memory 24 is coupled to the first PE 10 and the second PE 14 though a bus 28 and accessible by the first PE 10 and the second PE 14. That is, the password memory 24 is a shared memory for the first and second PEs 10 and 14. As in the computer system 100, the first PE 10 is a primary PE controlling the system 120. Upon the detection of a failure of the first PE 10, control of the system 120 is switched to the second PE 14 by switching circuitry (not shown).

As in the computer system 100, at the startup of the computer system 120, the first PE 10 performs the initialization process by reading the initialization information (configuration file) from the first memory 12. At this point, the enable password is set for the first PE 10. A password keeper (as indicated by 26 in FIG. 5) writes the enable password of the first PE 10 to the password memory 24. Once the enable password has been written in the password memory 24, the enable password is available to the second PE 14 as well as to the first PE 10. Alternatively and preferably, the enable password may be permanently stored in the password memory 24. In this case, the enable password is a shared password maintained in a shared memory (i.e., the password memory 24) and not available on the memory dedicated to each PE. Each PE can obtain the enable password from the password memory 24 whenever it needs the enable password.

The password keeper may be implemented in a controller or chipset (not shown) on any convenient location in the system 120, as is well understood by those of ordinary skill in the art. The password keeper maintains the enable password of the first PE 10 in the password memory 24, and controls transmission of the enable password data to and from the password memory 24.

The password keeper may write the enable password of the first PE 10 to the password memory 24 at the initialization of the system 120, for example, at the same time when the enable password is set for the first PE 10. The initialization information for the first PE 10 may include such instructions to cause the password keeper to write the enable password to the password memory 24. Also, the password keeper may write the enable password to the password memory 24 when the running configuration file for the first PE 10 is saved on the first memory 12. Typically, the running configuration file is saved in a non-volatile memory (i.e., the first memory 12) when changes are made to the running configuration and an explicit instruction is given. Preferably, the password keeper writes the enable password of the first PE 10 to the password memory 24 every time the enable password of the first PE 10 is changed, so that the current and updated enable password is always available to the second PE 14.

In the case where the first PE 10 fails and the second PE 14 takes over the first PE 10, the second PE 14 reboots the first PE 10 and initializes the system 120 by reading the initialization information (the configuration file) from the second memory 16. Thus, the second PE 14 becomes a primary PE controlling the system 120, and the first PE 10 a backup or secondary PE. During the initialization process by the second PE 14, the password keeper may write the enable password of the second PE 14 to the password memory 24. The initialization information for the second PE 14 may include instructions for the password keeper to write the enable password to the password memory 24.

Since the password memory 24 is also accessible by the first PE 10, the first PE 10 is also protected by the enable password of the second PE 14 when the second PE 14 controls the system 120. That is, when a user attempts to access the system 120 and issue a command using the first PE 10 (through a console port for the first PE 10), the commands issued by the first PE 10 are protected by the enable password of the second PE 14 as well. Preferably, the password keeper writes the enable password of the second PE 14 to the password memory 24 every time the enable password of the second PE 14 is changed, so that the current and updated enable password is always available to the first PE 10.

According to the embodiment described above, the password keeper "pushes" the enable password to the password memory 24. However, the password keeper may "pull" the enable password according to an alternate embodiment of the present invention. That is, the password keeper may pass the enable password of the first PE 10 maintained in the password memory 24 to the second PE 14 in response to a request from the second PE 14, and vice versa.

Figure 6:
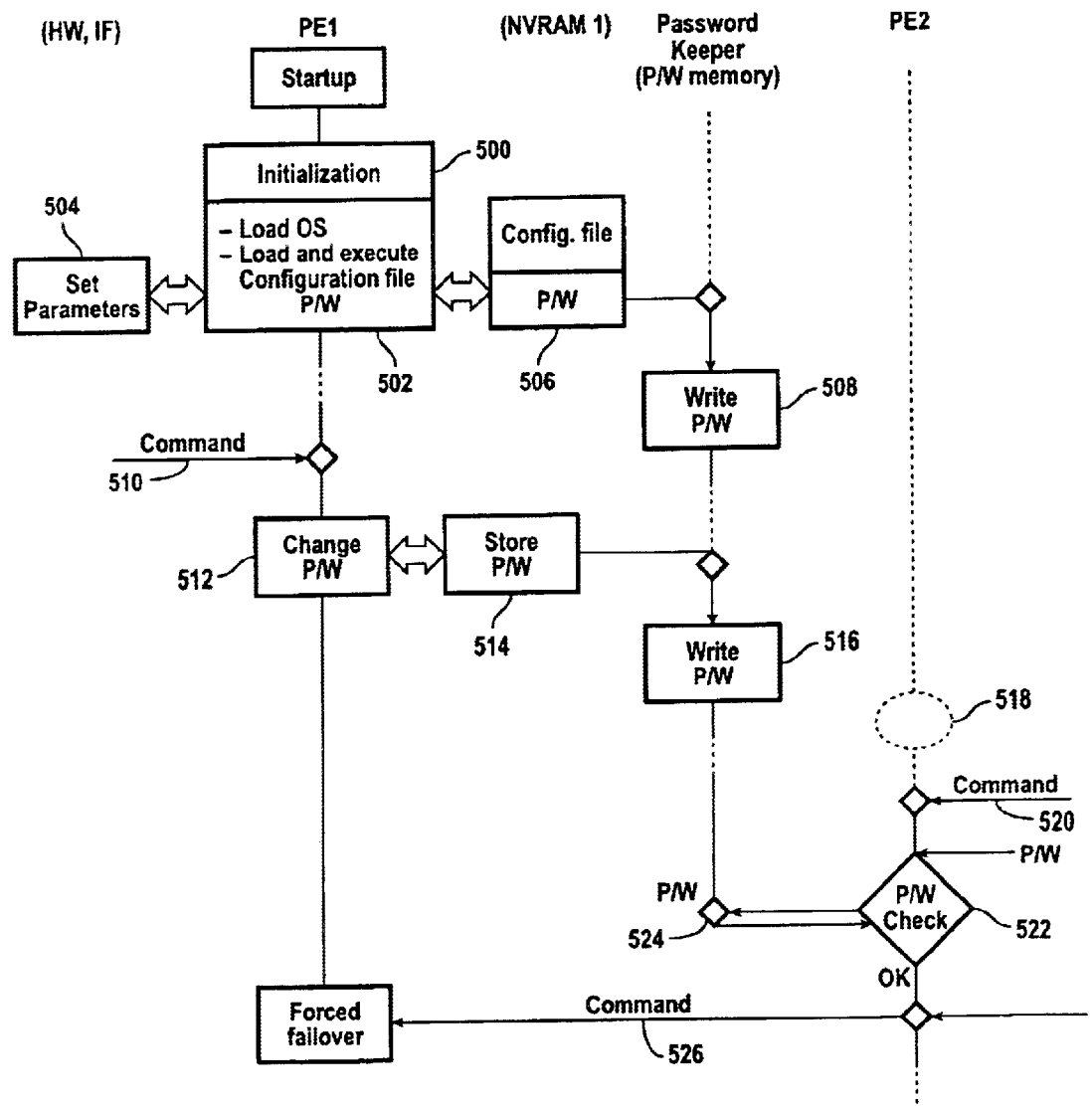
FIG. 6 is a process flow diagram illustrating an example of operation of a high reliability computer system according to one presently preferred embodiment of the present invention.

FIG. 6 schematically shows an example of the operation of a high reliability computer system 120 according to one embodiment of the present invention.

When the system 120 is started, the first PE 10 (PE1) performs an initialization of the system (block 500). The initialization process (blocks 500, 502, 504 and 506) by the first PE 10 is the same as the initialization process in blocks 400 to 406 of FIG. 4 as described above. When the enable password is set for the first PE 10 or stored in the first memory 12 (NVRAM1), the password keeper writes the enable password of the first PE 10 to the password memory 24 (block 508). An authorized (and privileged) user may access the system (step 510) and change the enable password after the initial setting thereof (block 512). When the enable password is changed, the new enable password is copied to the first memory 12 (block 514) if an explicit instruction is given. At the same time, the password keeper writes the new enable password to the password memory 24 (block 516).

Suppose that in some situations (518) a user such as a system administrator wants to access the system 120 through the second PE 14 (PE2) (520). When the user makes an attempt to issue a privileged command, the second PE 14 requires the user to enter the enable password (block 522). The second PE 14 accesses the password memory 24 and checks the entered password referring to the enable password stored in the password memory 24 (block 524). If the password check is successful, the user will be allowed to issue the privileged command, for example, changing the configuration or forcing a failover of the first PE 10 (step 526).

The above example illustrates the case where the password keeper "pushes" the enable password to the password memory 24. However, those of ordinary skill in the art will understand other case where the password passer "pulls" the enable password as well without more detailed explanation.

Figure 7:
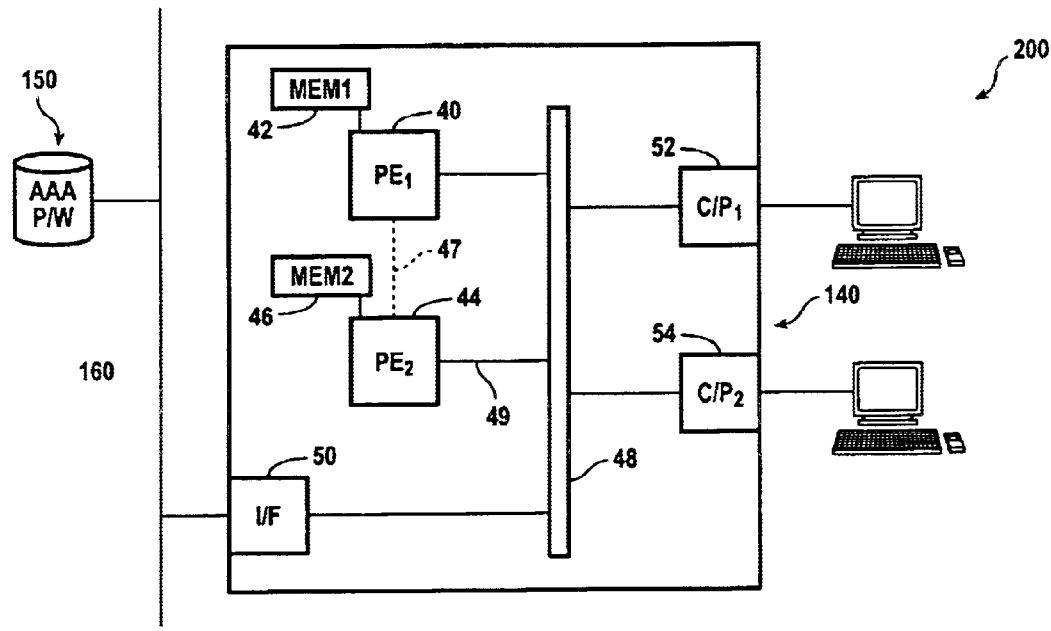
FIG. 7 is a system block diagram schematically illustrating a network system providing password protection for a high reliability computer system according to a presently preferred embodiment of the present invention.

FIG. 7 shows a network system 200 for providing password protection for a high reliability computer system, according to one embodiment of the present invention. The network system 200 includes a high reliability computer system 140 and an authentication, authorization and accounting (AAA) or other password server 150 coupled via an information bus 160 to the high reliability computer system 140. The information bus 160 may be a data communications network. The server 150 includes a database for maintaining the enable password P/W for the high reliability computer system 140.

The computer system 140 includes a first PE 40, a first memory 42, a second PE 44, and a second memory 46. The first memory 42 is accessible by the first PE 40 and contains initialization information for the first PE 40. The second memory 46 is accessible by the second PE 44 and contains initialization information for the second PE 44. The computer system 140 also includes a first console port 52 and a second console port 54. The first and second console ports 52 and 54 are typically dedicated to the first and second PEs 40 and 44, respectively. The first PE 40, the first memory 42, and the first console port 52 may be included in one CPU card (first CPU card). Similarly, the second PE 44, the second memory 46, and the second console port 54 may be included in another CPU card (second CPU card). The first PE 40 is a primary PE controlling the computer system 140. Upon the detection of a failure of the first PE 40, control of the computer system 140 is switched to the second PE 44 by switching circuitry (not shown), as discussed in the previous embodiments described above.

The high reliability computer system 140 also includes an interface 50 capable of communicating with the server 150 over the information bus 160. The interface 50 may be, for example, an Ethernet card. The interface 50 obtains the enable password from the server 150 in response to a request from either one of the first and second PEs 40 and 44, as described below.

The server 150 may perform user authentication, user authorization and user accounting functions. It may implements a Cisco ACS™ product for its AAA services, such as Cisco Secure™, available from Cisco Systems, Inc. of San Jose, Calif., or an equivalent product providing at least the password authentication and authorization function. In accordance with one embodiment of the present invention, the Remote Authentication Dial-In User Service (RADIUS) protocol is used as the communication protocol between the interface 50 and the server 150. RADIUS is an Internet protocol for carrying authentication, authorization, accounting and configuration information between devices that desire to authenticate their links and a shared AAA service. Those of ordinary skill in the art will realize that other Internet protocols such as TACACS+ can be used as acceptable authentication communications links between various devices and servers. The server 150 may be any server providing user authentication and authorization capable of maintaining and providing an enable password for a computer system.

Figure 8:
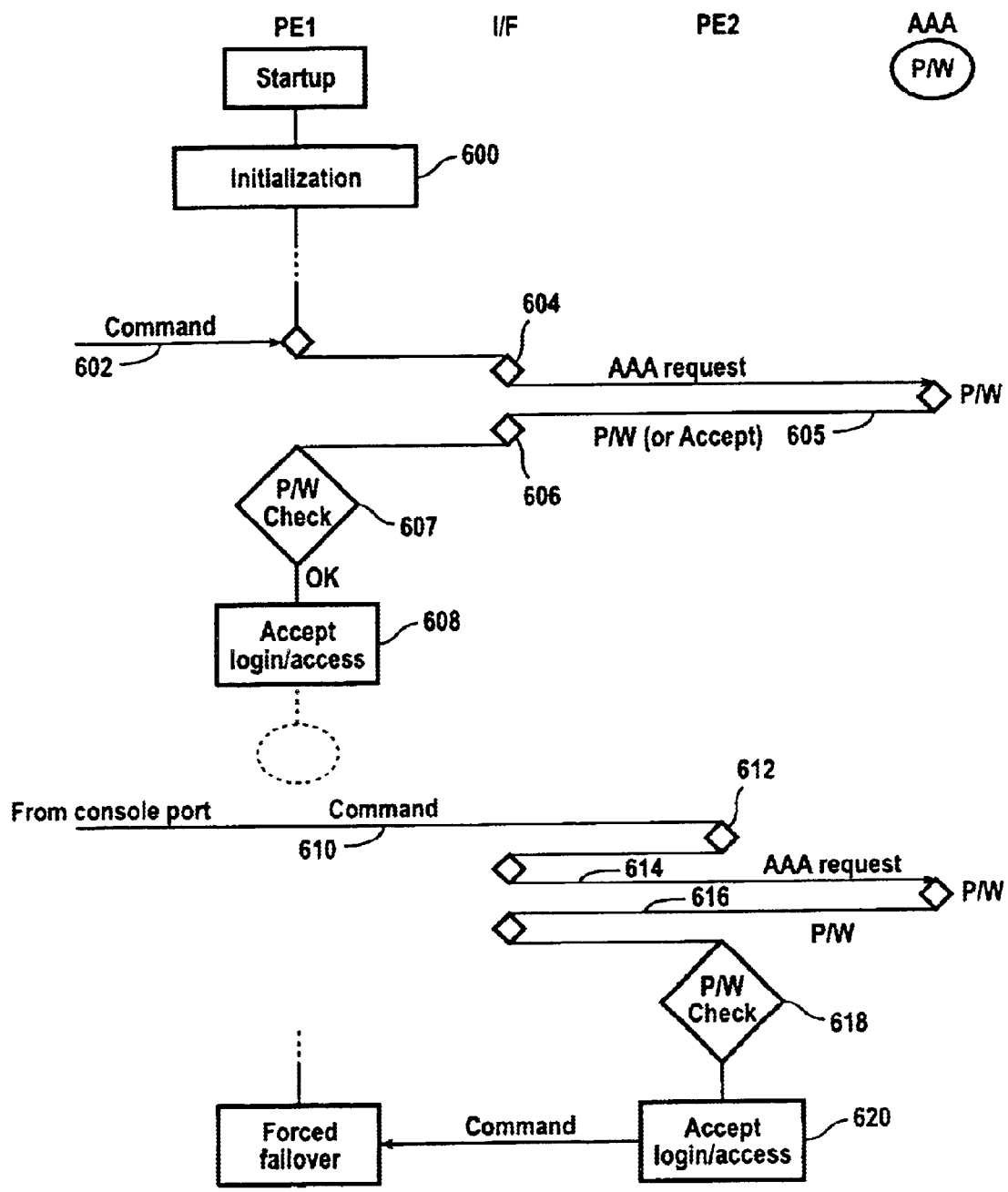
FIG. 8 is a process flow diagram illustrating an example of operation of the network system according to one presently preferred embodiment of the present invention.

FIG. 8 shows an example of operation of network system 200. When the computer system 140 is started, the first PE 40 (PE1) initiates the computer system 140 accordingly (block 600). In this embodiment, however, the enable password of the first PE 40 is maintained by the AAA or other password server 150. Therefore, the first PE 40 does not have to set or store the enable password during the configuration process in block 600. Other passwords such as access line passwords may be set during the configuration and stored in the first memory 42, or may be maintained by the server 150.

When the first PE 40 is controlling the computer system 140, access for issuing privileged commands is password-protected as follows. Suppose that a user such as a system administrator attempts to log in the computer system 140 through a user interface (not shown) or a console port 52 for the first PE 40. When the user first logs into the computer system 140, he/she is typically in a user mode and required to enter an enable password in order to get into the privileged mode. When the user makes an attempt to issue a privileged command (step 602), the first PE 40 controls the interface 50 (I/F) to make a request to the server 150 (step 604). Note that the request may be made for all log-ins (i.e., privileged and non-privileged).

Upon the request from the interface 50, the server 150 returns the enable password maintained in its database (step 605). The enable password P/W may be encrypted during the transmission over the information bus 160. The interface 50 receives and passes the enable password to the first PE 40 (step 606). Then the first PE 40 checks the entered enable password by comparing it with the received enable password (block 607). If the password checking is successful, the user will be allowed access to the privileged mode (block 608).

Alternatively, a request from interface 50 (in step 604) may include the entered enable password. In this case, the server 150 performs the user authentication and authorization using the entered enable password and the enable password maintained in its database. The server 150 then simply returns an access-accept packet or an access-reject packet to the interface 50. The first PE 40 accepts or rejects the user based on the packet returned from the server 150.

In addition, if the server 150 does not respond within a predetermined interval, the computer system 140 may use one or more locally-stored passwords, if the system is so configured. That is, the computer system 140 may also implement the password verification scheme of the computer system 100 or 120 as described above.

According to an alternate embodiment of the present invention, the first PE 40 may obtain the enable password from the server 150 at the initialization of the computer system 140. That is, the first PE 40 makes a request through the interface 50 during the initialization process at block 600. The server 150 returns the enable password in response to the request from the interface 50. The first PE 40 may store the received enable password in its memory during its control over the computer system 140. The initialization information of the first PE 40 may include such instructions for the interface 50 to access and obtain the enable password from the server 150.

When a user makes an attempted access to the computer system 140 that is under the control of the first PE 40 and tries to issue a command using the second PE 44 (step 610), the second PE 44 (PE2) makes a request through the interface 50 to the server 150 (steps 612 & 614). When the interface 50 is dedicated to the first PE 40 and the first PE 40 is controlling the computer system 140 (before the failure of the first PE 40), the second PE 44 uses the interface 50 through the first PE 40 as indicated by 47 in FIG. 7. When the interface 50 is dedicated to the second PE 44 or after the failure of the first PE 40, the second PE 44 can directly use the interface 50 as indicated by 49 in FIG. 7.

Upon the request from the interface 50, the server 150 returns the enable password to the interface 50 (step 616). The second CPU 44 obtains the enable password from the interface 50 and performs the password checking (block 618).

If the password checking is successful, the user will be allowed to issue privileged commands (block 620) and can issue a command such as to change the configuration or force the first PE 40 to fail (step 622). Therefore, any commands issued through the second PE 44 are protected by the enable password as well as those issued though the first PE 40.

Figure 9:
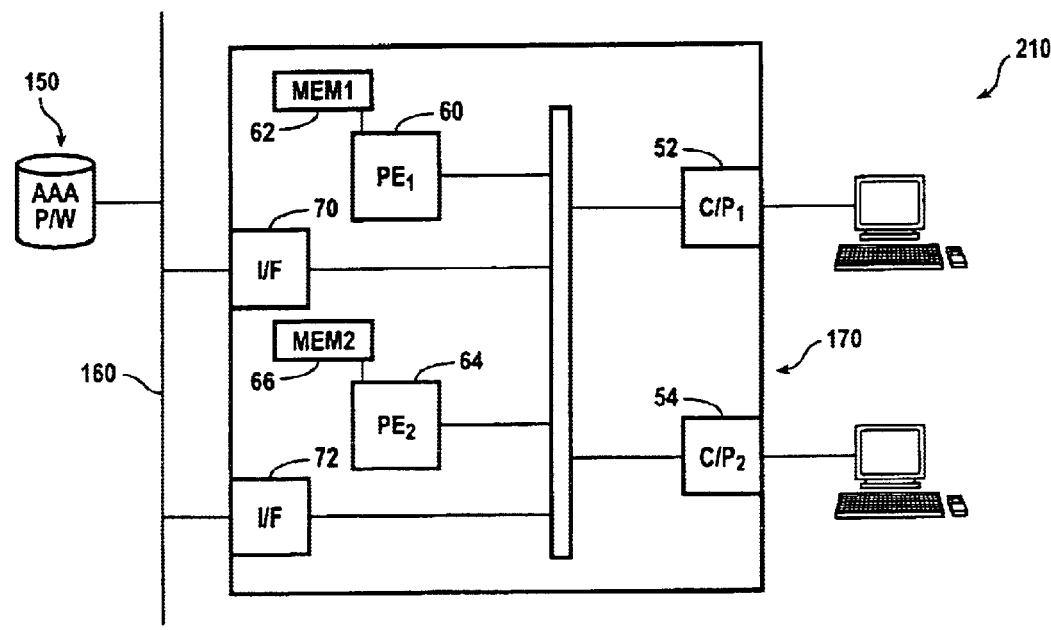
FIG. 9 is a system block diagram schematically illustrating a network system providing password protection for a high reliability computer system according to another presently preferred embodiment of the present invention.

FIG. 9 shows a network system 210 for providing password protection for a high reliability computer system, according to another embodiment of the present invention. The network system 210 includes a high reliability computer system 170 and an AAA or other password server 150 coupled via an information bus 160 to the high reliability computer system 170. The information bus 160 may be a data communications network. The server 150 includes a database for maintaining an enable password for the high reliability computer system 170. The function of the server 150 and the employed protocols are preferably the same as those in the network system 200 explained above.

The computer system 170 includes a first PE 60, a first memory 62, a second PE 64, a second memory 66, a first interface 70 for the first PE 60, a second interface 72 for the second PE 64, a first console port 52, and a second console port 54. The first memory 62 is accessible by the first PE 60 and contains initialization information for the first PE 60. The second memory 66 is accessible by the second PE 64 and contains initialization information for the second PE 64. The first and second console ports 52 and 54 are dedicated to the first and second PEs 60 and 64, respectively. The first and second interfaces 70 and 72 are dedicated to the first and second PEs 60 and 64, respectively, and capable of communicating with the AAA server 150 over the information bus 160. Each of the first and second interfaces 70 and 72 may be an Ethernet card. The interfaces 70 and 72 obtain the enable password from the server 150 in response to a request from the first and second PEs 60 and 64, respectively.

The first PE 60 is a primary PE controlling the computer system 170. Upon the detection of a failure of the first PE 60, control of the computer system 170 is switched to the second PE 64 by switching circuitry (not shown), as in the previous embodiments.

The first PE 60, the first memory 62, the first console port 52, and the first interface 70 may be included in one CPU card (first CPU card). The second PE 64, the second memory 66, the second console port 54, and the second interface 72 may be included in another CPU card (second CPU card). In such a case, the switching circuitry may switch the control of the computer system 170 from the first PE card to the second PE card upon a failure of any function of the first CPU card.

Figure 10:
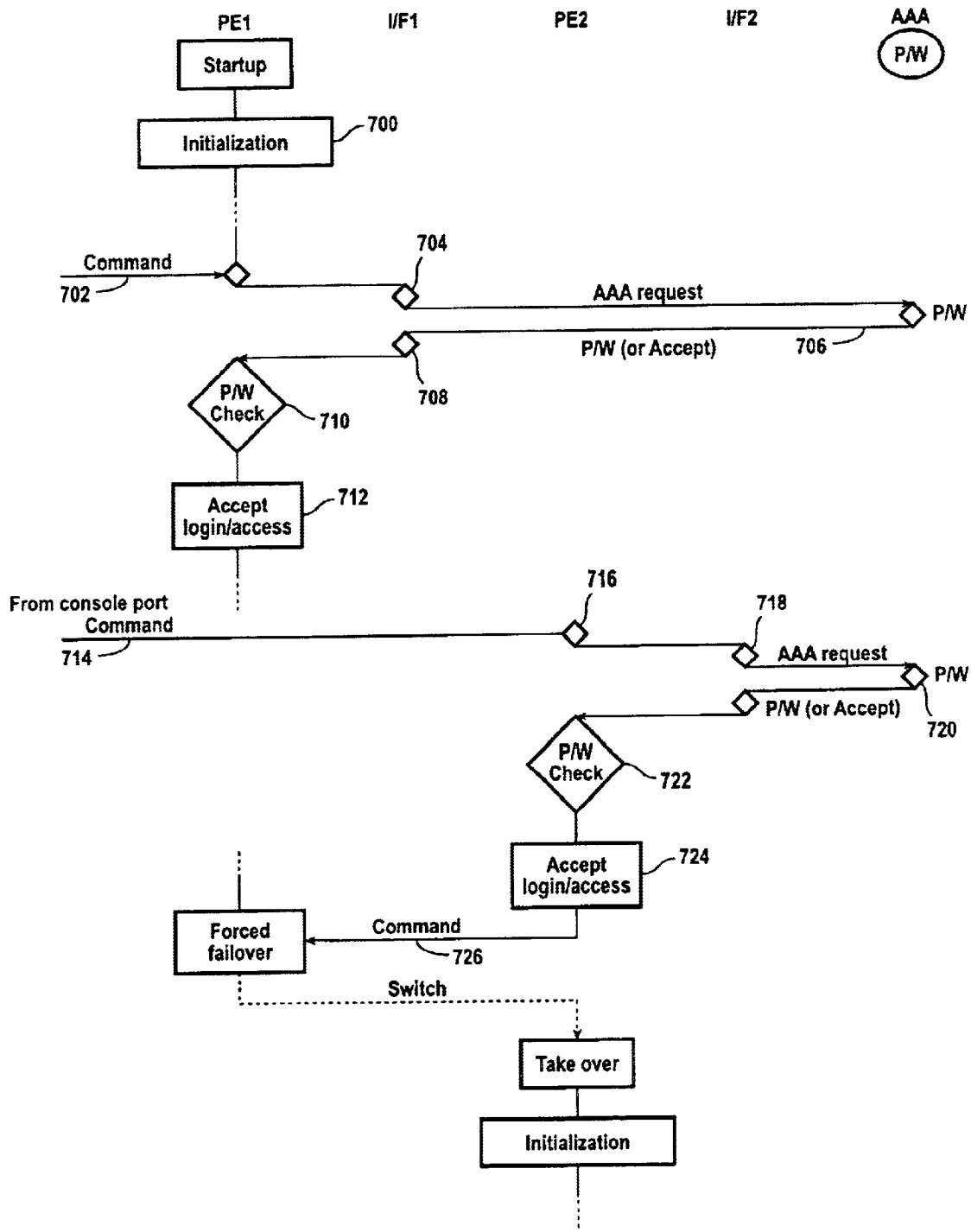
FIG. 10 is a process flow diagram illustrating an example of operation of the network system according to one presently preferred embodiment of the present invention.

FIG. 10 shows an example of operations of the network system 210 according to one embodiment of the present invention. When the computer system 170 is started, the first PE 60 (PE1) performs the initialization of the computer system 170 accordingly (700). Since the enable password of the first PE 60 is maintained by the AAA or other password server 150 (AAA), the first PE 60 does not have to set or store the enable password during the configuration process (block 700). Other passwords such as access line passwords may be set during the configuration process and stored in the first memory 62, or may be maintained by the server 150.

When the first PE 60 is controlling the computer system 170, access to a privileged mode is password-protected as follows. Suppose that a user such as a system administrator attempts to log in the computer system 170 through a user interface (not shown) or a console port 52 for the first PE 60. When the user first logs in the system, he/she is typically in a user mode and required to enter an enable password in order to be able to issue a privileged command. When the user makes an attempt to issue privileged command (step 702), the first PE 60 makes a request through the first interface 70 to the server 150 (step 704).

Upon the request from the first interface 70, the server 150 returns the enable password maintained in its database (step 706). The enable password may be encrypted during the transmission over the information bus 160. The first interface 70 (I/F1) receives and passes the enable password to the first PE 60 (step 708). Then the first PE 60 checks the entered password by comparing it with the received enable password (block 710). If the password checking is successful, the user will be allowed to issue privileged commands (block 712).

When a user makes an attempt to issue a privileged command using the second PE 64 (PE2) while the computer system 210 is under the control of the first PE 60 (714), the second PE 64 makes a request through the second interface 72 to the server 150 (steps 716 & 718). Such an access may use a console port 54 for the second PE 64. Upon the request from the second interface 72 (I/F2), the server 150 returns the enable password (720). The second interface 72 passes the received enable password to the second PE 64. The second PE 64 checks the entered password by comparing it with the received enable password (722). If the password checking is successful, the user will be allowed to issue a command (block 724) such as changing the configuration or forcing the first PE 60 to fail (step 726). Therefore, any commands issued through the second PE 64 are protected by the enable password as well as issued though the first PE 60.

Alternatively, a request from the first interface 70 or the second interface 72 (in steps 704 or 716) may include the entered enable password. In this case, the server 150 performs the user authentication and authorization using the entered enable password and the maintained enable password. In this case, the server 150 simply returns an access-accept packet or an access-reject packet to, for example, the first interface 70 where the request came from. The first PE 60 accepts or rejects the user's attempt to issue a privileged command based on the packet returned from the server 150. This is the same in the case of the second interface 72 and the second PE 64.

Alternatively, according to one embodiment of the present invention, the first PE 60 may obtain the enable password from the server 150 at the initialization of the computer system 170. That is, the first PE 60 makes a request through the first interface 70 during the initialization process (block 700). The server 150 returns the enable password upon the request from the first interface 70. The first PE 60 may store the received enable in its memory during its control over the computer system 210. The initialization information of the first PE 60 may include such instructions for the first interface 70 to access and obtain the enable password from the server 150.

In the case where the second PE 64 fails over to the first PE 60, the first PE 60 obtains the enable password at that time. Therefore, if the first PE 60 already had the enable password at the time of the initialization, it does not have to obtain it from server 150 unless the enable password of the first PE 60 is different from that of the second PE 64. This is the same for the second PE 64 when it takes over the first PE 60 and then performs the initialization process.

According to the present invention as described above, the enable password is made available to the second PE without causing the second PE to read the initialization information from the configuration file for the second PE. That is, when the computer system is under the control of the first PE, access to the computer system through the second PE (console port of the second PE) is protected by the enable password of the first PE. Thus, an enhanced reliability, such as maintaining the high performance of the system, is realized without creating a security lapse in the system.

It should also be noted that the term "password" as used herein is intended to be broad enough to encompass surrogates for conventional passwords. These include "shared secret" mechanisms, encrypted passwords, mechanisms employing a secure password server. Password files relating users to their respective password and privilege may also be employed. Thus, as used herein, the term "password" is a mechanism of any character employed to distinguish whether a particular identified user is authorized to use a particular command or set of commands.

While embodiments and applications of this invention have been shown and described, it would be apparent to those skilled in the art having the benefit of the disclosure many more modifications than mentioned above are possible without departing from the inventive concepts herein. The invention, therefore, is not to be restricted except in the spirit of the appended claims.

What is claimed is:

1. A high reliability computer system, said system comprising:
   a first processing engine (PE);
   a first memory accessible by said first PE, containing initialization information for said first PE;
   a second PE;
   a second memory accessible by said second PE, containing initialization information for said second PE;
   a third memory accessible by said first PE, said third memory having a location for storing an enable password for said first PE, the enable password protecting access to a privileged mode and execution of privileged mode commands;
   a fourth memory accessible by said second PE;
   circuitry for automatically switching control of said system from said first PE to said second PE upon detection of a failure of said first PE; and
   a password passer writing said enable password of said first PE to the fourth memory accessible by said second PE.

2. A high reliability computer system according to claim 1, wherein said password passer writes said enable password of said first PE to said fourth memory at the initialization of the system.

3. A high reliability computer system according to claim 1, wherein said password passer writes said enable password of said first PE to said fourth memory every time said enable password of said first PE is changed.

4. A high reliability computer system according to claim 1, wherein said password passer writes said enable password of said first PE to said fourth memory in response to a command from said second PE.

5. A high reliability computer system according to claim 1, wherein password passer reads said enable password of said first PE from said first memory and writes said enable password to said fourth memory.

6. A high reliability computer system according to claim 1, wherein said system is a network device.

7. A high reliability computer system according to claim 6, wherein said network device is a router.

8. A high reliability computer system, said system comprising:
   a first PE;
   a first memory accessible by said first PE, containing initialization information for said first PE;
   a second PE;
   a second memory accessible by said second PE, containing initialization information for said second PE;
   circuitry for automatically switching control of said system from said first PE to said second PE upon detection of a failure of said first PE;
   a password memory accessible by said first and second PEs, having a location for storing an enable password for the system, the enable password protecting access to a privileged mode and execution of privileged mode commands; and
   a password keeper for maintaining said enable password in said password memory for said first and second PEs.

9. A high reliability computer system according to claim 8, wherein said password keeper reads said enable password from said first memory and writes said enable password to said password memory at the initialization of the system.

10. A high reliability computer system according to claim 8, wherein said initialization information for said first PE includes instructions for said password keeper to write said enable password to said password memory.

11. A high reliability computer system according to claim 8, wherein said initialization information for said second PE includes instructions for said password keeper to write said enable password to said password memory.

12. A high reliability computer system according to claim 8, wherein said password keeper writes said enable password to said password memory every time said enable password is changed.

13. A high reliability computer system according to claim 8, wherein said password keeper passes said enable password maintained in said password memory to either one of said first and second PEs in response to a request therefrom.

14. A high reliability computer system according to claim 8, wherein said system is a network device.

15. A high reliability computer system according to claim 14, wherein said network device is a router.

16. A network system for providing password protection for a high reliability computer system, on a data communications network including a password server having a database for maintaining an enable password for said high reliability computer system, said password server being coupled via an information bus to said high reliability computer system, said system comprising:
 a first PE;
 a first memory accessible by said first PE, containing initialization information for said first PE;
 a second PE;
 a second memory accessible by said second PE, containing initialization information for said second PE;
 circuitry for automatically switching control of said system from said first PE to said second PE upon detection of a failure of said first PE; and
 an interface capable of communicating with the password server over the information bus, said interface obtaining an enable password from the password server in response to a request from either one of said first and second PEs, the enable password protecting access to a privileged mode and execution of privileged mode commands.

17. A network system according to claim 16, wherein said second PE authenticates incoming users by requesting authentication from said password server.

18. A network system according to claim 16, wherein said first PE obtains said enable password from said password server via said interface at the initialization of the system.

19. A network system according to claim 16, wherein said initialization information for said first PE includes instructions to access and obtain said enable password from said password server.

20. A network system according to claim 16, wherein the high reliability computer system is a network device.

21. A network system according to claim 20, wherein said network device is a router.

22. A system for providing password protection for a high reliability computer system on a data communications network including a password server having a database for maintaining an enable password for said high reliability computer system, said password server being coupled via an information bus to said high reliability computer system, said system comprising:
 a first PE;
 a first memory accessible by said first PE, containing initialization information for said first PE;
 a first interface for said first PE, said first interface capable of communicating user authentication requests and responses with the password server over the information bus, said first interface obtaining an enable password from the password server in response to a request from said first PE, the enable password protecting access to a privileged mode and execution of privileged mode commands;
 a second PE;
 a second memory accessible by said second PE, containing initialization information for said second PE;
 a second interface for said second PE, said second interface capable of communicating user authentication requests and responses with the password server over the information bus, said second interface obtaining said enable password from the password server in response to a request from said second PE; and
 circuitry for automatically switching control of said system from said first PE to said second PE upon detection of a failure of said first PE.

23. A system according to claim 22, wherein the high reliability computer system is a network device.

24. A system according to claim 23, wherein said network device is a router.

25. A method for operating a high reliability computer system, said system including a first PE, a first memory accessible by said first PE, said first memory containing initialization information for said first PE and having a location for storing an enable password for said first PE, a second PE, and a second memory accessible by said second PE, said second memory containing initialization information for said second PE, said method comprising:
 writing said enable password of said first PE to a third memory accessible by said second PE, said enable password protecting access to a privileged mode and execution of privileged mode commands; and
 automatically switching control of said system from said first PE to said second PE upon detection of a failure of said first PE.

26. A method according to claim 25, wherein said writing of said enable password of said first PE to said third memory is performed at the initialization of the system.

27. A method according to claim 25, wherein said writing of said enable password of said first PE to said third memory is performed every time said enable password of said first PE is changed.

28. A method according to claim 17, wherein said writing of said enable password of said first PE to said third memory is performed in response to a command from said second PE.

29. A method according to claim 25, wherein the high reliability computer system is a network device.

30. A method according to claim 29, wherein said network device is a router.

31. A method for operating a high reliability computer system, said system including a first PE, a first memory accessible by said first PE, said first memory containing initialization information for said first PE, a second PE, and a second memory accessible by said second PE, said second memory containing initialization information for said second PE, said method comprising:

providing a password memory accessible by said first and second PEs, having a location for storing an enable password, said enable password protecting access to a privileged mode and execution of privileged mode commands;

maintaining said enable password for said first and second PEs in said password memory; and automatically switching control of said system from said first PE to said second PE upon detection of a failure of said first PE.

32. A method according to claim 31, wherein said maintaining includes:

reading said enable password from said first memory and writing said enable password to said password memory at the initialization of the system.

33. A method according to claim 31, wherein said maintaining includes:

writing said enable password to said password memory every time said enable password is changed.

34. A method according to claim 31, wherein said maintaining includes:

writing said enable password to said password memory in response to a command from said first PE.

35. A method according to claim 31, wherein said maintaining includes:

passing said enable password maintained in said password memory to either one of said first and second PEs in response to a request therefrom.

36. A method according to claim 31, wherein the high reliability computer system is a network device.

37. A method according to claim 36, wherein said network device is a router.

38. A method for providing password protection for a high reliability computer system, said system including a first PE, a first memory accessible by said first PE, said first memory containing initialization information for said first PE, a second PE, a second memory accessible by said second PE, said second memory containing initialization information for said second PE, and circuitry for automatically switching control of said system from said first PE to said second PE upon detection of a failure of said first PE, said method comprising:

sending an enable password for the high reliability computer system for storage in a database of a server coupled to the high reliability computer system via an information bus, the enable password protecting access to a privileged mode and execution of privileged mode commands;

providing an interface capable of communicating with the password server over the information bus; and obtaining the enable password from the password server through the interface in response to a request from either one of the first and second PEs.

39. A method according to claim 38, wherein the high reliability computer system is a network device.

40. A method according to claim 39, wherein said network device is a router.

41. A method according to claim 38, further comprising authenticating incoming users by requesting authentication from the password server.

42. A method for providing password protection for a high reliability computer system, said system including a first PE, a first memory accessible by said first PE, said first memory containing initialization information for said first PE, a second PE, a second memory accessible by said second PE, said second memory containing initialization information for said second PE, and circuitry for automatically switching control of said system from said first PE to said second PE upon detection of a failure of said first PE, said method comprising:

sending an enable password for the high reliability computer system for storage in a database of a password server coupled to the high reliability computer system via an information bus, the enable password protecting access to a privileged mode and execution of privileged mode commands;

communicating user authentication requests and responses with the password server over the information bus via a first interface and obtaining the enable password from the password server for the first PE, the enable password protecting access to a privileged mode and execution of privileged mode commands; and communicating user authentication requests and responses with the password server over the information bus via a second interface and obtaining the enable password from the password server for said second PE.

43. A method according to claim 42, wherein the high reliability computer system is a network device.

44. A method according to claim 43, wherein said network device is a router.

45. A program storage device readable by a machine, tangibly embodying a program of instructions executable by the machine to perform method steps for operating a high reliability computer system, said system including a first PE, a first memory accessible by said first PE, said first memory containing initialization information for said first PE and having a location for storing an enable password for said first PE, a second PE, and a second memory accessible by said second PE, said second memory containing initialization information for said second PE, said method steps comprising:

writing said enable password of said first PE to a third memory accessible by said second PE, said enable password protecting access to a privileged mode and execution of privileged mode commands; and automatically switching control of said system from said first PE to said second PE upon detection of a failure of said first PE.

46. A program storage device according to claim 45, wherein said method step of writing said enable password of said first PE to said third memory is performed at the initialization of the system.

47. A program storage device according to claim 45, wherein said method step of writing said enable password of said first PE to said third memory is performed every time said enable password of said first PE is changed.

48. A program storage device according to claim 45, wherein said method step of writing said enable password of said first PE to said third memory is performed in response to a command from said second PE.

49. A program storage device according to claim 45, wherein the high reliability computer system is a network device.

50. A program storage device according to claim 49, wherein said network device is a router.

51. A program storage device readable by a machine, tangibly embodying a program of instructions executable by the machine to perform method steps for operating a high reliability computer system, said system including a first PE, a first memory accessible by said first PE, said first memory containing initialization information for said first PE, a second PE, and a second memory accessible by said second PE, said second memory containing initialization information for said second PE, said method steps comprising:

providing a password memory accessible by said first and second PEs, having a location for storing an enable password, said enable password protecting access to a privileged mode and execution of privileged mode commands;

maintaining said enable password for said first and second PEs in said password memory; and automatically switching control of said system from said first PE to said second PE upon detection of a failure of said first PE.

52. A program storage device according to claims 51, wherein said method step of maintaining includes:

reading said enable password from said first memory and writing said enable password to said password memory at the initialization of the system.

53. A program storage device according to claim 51, wherein said method step of maintaining includes:

writing said enable password to said password memory every time said enable password is changed.

54. A program storage device according to claim 51, wherein said method step of maintaining includes:

writing said enable password to said password memory in response to a command from said first PE.

55. A program storage device according to claim 51, wherein said method step of maintaining includes:

passing said enable password maintained in said password memory to either one of said first and second PEs in response to a request therefrom.

56. A program storage device according to claim 51, wherein the high reliability computer system is a network device.

57. A program storage device according to claim 56, wherein said network device is a router.

58. A program storage device readable by a machine, tangibly embodying a program of instructions executable by the machine to perform method steps for providing password protection for a high reliability computer system, said system including a first PE, a first memory accessible by said first PE, said first memory containing initialization information for said first PE, a second PE, a second memory accessible by said second PE, said second memory containing initialization information for said second PE, and circuitry for automatically switching control of said system from said first PE to said second PE upon detection of a failure of said first PE, said method steps comprising:

sending an enable password for the high reliability computer system for storage in a database of a password server coupled to the high reliability computer system via an information bus, the enable password protecting access to a privileged mode and execution of privileged mode commands on the high reliability computer system;

providing an interface capable of communicating with the password server over the information bus; and obtaining the enable password from the password server through the interface in response to a request from either one of the first and second PEs.

59. A program storage device according to claim 58, wherein said method steps further comprises authenticating incoming users by requesting authentication from the password server.

60. A program storage device according to claim 58, wherein the high reliability computer system is a network device.

61. A program storage device according to claim 60, wherein said network device is a router.

62. A program storage device readable by a machine, tangibly embodying a program of instructions executable by the machine to perform method steps for providing password protection for a high reliability computer system, said system including a first PE, a first memory accessible by said first PE, said first memory containing initialization information for said first PE, a second PE, a second memory accessible by said second PE, said second memory containing initialization information for said second PE, and circuitry for automatically switching control of said system from said first PE to said second PE upon detection of a failure of said first PE, said method steps comprising:

sending an enable password for the high reliability computer system for storage in a database of an authentication, authorization and accounting (AAA) server coupled to the high reliability computer system via an information bus, the enable password protecting access to a privileged mode and execution of privileged mode commands on the high reliability computer system;

communicating user authentication requests and responses with the AAA server over the information bus via a first interface and obtaining the enable password from the AAA server for the first PE; and communicating user authentication requests and responses with the AAA server over the information bus via a second interface and obtaining the enable password from the AAA server for the second PE.

63. A program storage device according to claim 62, wherein the high reliability computer system is a network device.

64. A program storage device according to claim 63, wherein said network device is a router.

65. An apparatus for operating a high reliability computer system, said system including a first PE, a first memory accessible by said first PE, said first memory containing initialization information for said first PE and having a location for storing an enable password for said first PE, a second PE, and a second memory accessible by said second PE, said second memory containing initialization information for said second PE, said apparatus comprising:

means for writing said enable password of said first PE to a third memory accessible by said second PE, said enable password protecting access to a privileged mode and execution of privileged mode commands; and means for automatically switching control of said system from said first PE to said second PE upon detection of a failure of said first PE.

66. An apparatus according to claim 65, wherein the high reliability computer system is a network device.

67. An apparatus according to claim 66, wherein said network device is a router.

68. An apparatus for operating a high reliability computer system, said system including a first PE, a first memory accessible by said first PE, said first memory containing initialization information for said first PE, a second PE, and a second memory accessible by said second PE, said second memory containing initialization information for said second PE, said apparatus comprising:

means for providing said first and second PEs with access to an enable password, the enable password protecting access to a privileged mode and execution of privileged mode commands;

means for maintaining said enable password for said first and second PEs; and means for automatically switching control of said system from said first PE to said second PE upon detection of a failure of said first PE.

69. An apparatus according to claim 68, wherein the high reliability computer system is a network device.

70. An apparatus according to claim 69, wherein said network device is a router.

71. An apparatus for providing password protection for a high reliability computer system, said system including a first PE, a first memory accessible by said first PE, said first memory containing initialization information for said first PE, a second PE, a second memory accessible by said second PE, said second memory containing initialization information for said second PE, and circuitry for automatically switching control of said system from said first PE to said second PE upon detection of a failure of said first PE, said apparatus comprising:

means for sending an enable password for the high reliability computer system for storage in a database of a password server coupled to the high reliability computer system via an information bus, the enable password protecting access to a privileged mode and execution of privileged mode commands on the high reliability computer system; and means for communicating with the password server over the information bus and obtaining the enable password from the password server in response to a request from either one of the first and second PEs.

72. An apparatus according to claim 71, wherein the high reliability computer system is a network device.

73. An apparatus according to claim 72, wherein said network device is a router.

74. An apparatus for providing password protection for a high reliability computer system, said system including a first PE, a first memory accessible by said first PE, said first memory containing initialization information for said first PE, a second PE, a second memory accessible by said second PE, said second memory containing initialization information for said second PE, and circuitry for automatically switching control of said system from said first PE to said second PE upon detection of a failure of said first PE, said apparatus comprising:

means for sending an enable password for the high reliability computer system for storage in a database of a password server coupled to the high reliability computer system via an information bus, the enable password protecting access to a privileged mode and execution of privileged mode commands;

means for communicating user authentication requests and responses with the password server over the information bus via a first interface and obtaining the enable password from the password server for the first PE; and means for communicating user authentication requests and responses with the password server over the information bus via a second interface and obtaining the enable password from the password server for the second PE.

75. An apparatus according to claim 74, wherein the high reliability computer system is a network device.

76. An apparatus according to claim 75, wherein said network device is a router.

77. A security system for providing password protection for a high reliability network device on a data communications computer network, said security system comprising:

a password server having a database for maintaining an enable password for the high reliability network device, said password server being coupled via an information bus to the high reliability network device; and the high reliability network device, including:
a first processing engine (PE);
a first memory accessible by said first PE, containing initialization information for said first PE;
a second PE;
a second memory accessible by said second PE, containing initialization information for said second PE;
circuitry for automatically switching control of said system from said first PE to said second PE upon detection of a failure of said first PE; and
an interface capable of communicating with said password server over the information bus, said interface obtaining an enable password from said password server in response to a request from either one of said first and second PEs, the enable password protecting access to a privileged mode and execution of privileged mode commands.

78. A security system according to claim 77, wherein said second PE authenticates incoming users by requesting authentication from said password server.

79. A security system according to claim 77, wherein said first PE obtains said enable password from said password server via said interface at the initialization of the system.

80. A security system according to claim 77, wherein said initialization information for said first PE includes instructions to access and obtain said enable password from said password server.

81. A security system for providing password protection for a high reliability network device on a data communications network, said security system comprising:

a password server having a database for maintaining an enable password for the high reliability network device, said password server being coupled via an information bus to said high reliability network device; and the high reliability network device, including:
a first PE;
a first memory accessible by said first PE, containing initialization information for said first PE;
a first interface for said first PE, said first interface capable of communicating user authentication requests and responses with the password server over the information bus, said first interface obtaining an enable password from the password server in response to a request from said first PE, the enable password protecting access to a privileged mode and execution of privileged mode commands;
a second PE;
a second memory accessible by said second PE, containing initialization information for said second PE;
a second interface for said second PE, said second interface capable of communicating user authentication requests and responses with the password server over the information bus, said second interface obtaining said enable password from the password server in response to a request from said second PE; and
circuitry for automatically switching control of said system from said first PE to said second PE upon detection of a failure of said first PE.

82. A high reliability network device, comprising:
a first processing engine (PE);
a first memory accessible by said first PE, containing initialization information for said first PE;
a first consol port coupled to said first PE via a bus, adapted to receive commands from a first consol;

a second PE;

a second memory accessible by said second PE, containing initialization information for said second PE;

a second consol port coupled to said second PE via the bus, adapted to receive commands from a second consol;

a third memory accessible by said first PE, said third memory having a location for storing an enable password for said first PE, the enable password protecting access to a privileged mode and execution of privileged mode commands;

a fourth memory accessible by said second PE;

circuitry for automatically switching control of said system from said first PE to said second PE upon detection of a failure of said first PE; and a password passer writing said enable password of said first PE to the fourth memory accessible by said second PE.

83. A high reliability network device, comprising:

a first PE;

a first memory accessible by said first PE, containing initialization information for said first PE;

a first consol port coupled to said first PE via a bus, adapted to receive commands from a first consol;

a second PE;

a second memory accessible by said second PE, containing initialization information for said second PE;

a second consol port coupled to said second PE via the bus, adapted to receive commands from a second consol;

circuitry for automatically switching control of said system from said first PE to said second PE upon detection of a failure of said first PE;

a password memory accessible by said first and second PEs, having a location for storing an enable password for the system, the enable password protecting access to a privileged mode and execution of privileged mode commands; and a password keeper for maintaining said enable password in said password memory for said first and second PEs.

84. A high reliability network device, comprising:

a first processing engine (PE);

a first memory accessible by said first PE, containing initialization information for said first PE; and a first consol port coupled to said first PE via a bus, adapted to receive commands from a first consol;

a second PE;

a second memory accessible by said second PE, containing initialization information for said second PE; and a second consol port coupled to said second PE via the bus, adapted to receive commands from a second consol;

circuitry for automatically switching control of said system from said first PE to said second PE upon detection of a failure of said first PE; and an interface coupled to said first and second PEs via the bus, said interface being capable of communicating with a password server over an information bus, said interface obtaining an enable password from the password server in response to a request from either one of said first and second PEs, the enable password protecting access to a privileged mode and execution of privileged mode commands.

85. A high reliability network device according to claim 84, wherein said interface comprises:

a first interface dedicated to said first PE; and a second interface dedicated to said second PE.

* * * * *